(12) United States Patent
Sugiyama et al.

(10) Patent No.: US 11,346,731 B2
(45) Date of Patent: May 31, 2022

(54) DETECTION CIRCUIT AND DETECTION METHOD FOR MAGNETOSTRICTIVE TORQUE SENSOR

(71) Applicants: Hitachi Metals, Ltd., Tokyo (JP); NSK Ltd., Tokyo (JP)

(72) Inventors: Yuta Sugiyama, Tokyo (JP); Teruyuki Nakamura, Tokyo (JP); Junji Ono, Kanagawa (JP); Kota Fukuda, Shizuoka (JP)

(73) Assignees: HITACHI METALS, LTD., Tokyo (JP); NSK LTD., Tokyo (JP)

( * ) Notice: Subject to any disclaimer, the term of this patent is extended or adjusted under 35 U.S.C. 154(b) by 0 days.

(21) Appl. No.: 17/190,138

(22) Filed: Mar. 2, 2021

(65) Prior Publication Data
US 2021/0278296 A1    Sep. 9, 2021

(30) Foreign Application Priority Data
Mar. 3, 2020 (JP) .............................. JP2020-036166

(51) Int. Cl.
*G01L 3/10* (2006.01)

(52) U.S. Cl.
CPC .............. *G01L 3/103* (2013.01); *G01L 3/105* (2013.01)

(58) Field of Classification Search
CPC .......... G01L 3/103; G01L 3/105; G01L 3/102
See application file for complete search history.

(56) References Cited

U.S. PATENT DOCUMENTS

| 4,760,745 A * | 8/1988 | Garshelis ................ G01L 3/102 73/862.336 |
| 4,896,544 A * | 1/1990 | Garshelis ................ G01L 3/102 73/862.336 |
| 4,933,580 A * | 6/1990 | Ishino ..................... G01L 3/102 73/DIG. 2 |
| 5,205,145 A | 4/1993 | Ishino et al. |
| 6,260,423 B1 * | 7/2001 | Garshelis ................ G01L 3/102 324/207.21 |

(Continued)

FOREIGN PATENT DOCUMENTS

| JP | H03-110432 A | 5/1991 |
| JP | H05-66165 A | 3/1993 |

(Continued)

OTHER PUBLICATIONS

International Search Report dated May 25, 2021 in International Patent Application No. PCT/JP2021/007886.

(Continued)

*Primary Examiner* — Freddie Kirkland, III
(74) *Attorney, Agent, or Firm* — Roberts Calderon Safran & Cole P.C.

(57) ABSTRACT

A detection circuit for a magnetostrictive torque sensor is configured to detect a torque applied to a magnetostrictive material treated by shot peening. The detection circuit includes a detection coil provided around the magnetostrictive material, and a drive unit for providing alternating current excitation to the detection coil. The torque applied to the magnetostrictive material is detected based on a change in inductance of the detection coil, and the drive unit provides alternating current excitation at a frequency at which a skin effect thickness is not more than an effective depth of the shot peening.

9 Claims, 5 Drawing Sheets

(56) References Cited

U.S. PATENT DOCUMENTS

| | | | |
|---|---|---|---|
| 7,263,904 B2 * | 9/2007 | Yoshida | G01L 5/0009 |
| | | | 73/862.331 |
| 9,983,075 B2 * | 5/2018 | Nakamura | G01L 3/102 |
| 10,502,646 B2 * | 12/2019 | Ishikawa | G01L 3/102 |
| 10,845,257 B2 * | 11/2020 | Stephan | G01L 3/103 |
| 2007/0022809 A1 | 2/2007 | Yoshida et al. | |
| 2017/0284877 A1 | 10/2017 | Nakamura | |

FOREIGN PATENT DOCUMENTS

| | | |
|---|---|---|
| JP | H11-326080 A | 11/1999 |
| JP | 3526750 B | 5/2004 |
| JP | 2004-340783 A | 12/2004 |
| JP | 2017-187299 A | 10/2017 |

OTHER PUBLICATIONS

Written Opinion of the International Search Authority dated May 25, 2021 in International Patent Application No. PCT/JP2021/007886 (with English translation).

\* cited by examiner

DETECTION CIRCUIT AND DETECTION METHOD FOR MAGNETOSTRICTIVE TORQUE SENSOR

CROSS-REFERENCE TO RELATED APPLICATION

The present patent application claims the priority of Japanese patent application No. 2020-036166 filed on Mar. 3, 2020, and the entire contents of Japanese patent application No. 2020-036166 are hereby incorporated by reference.

BACKGROUND OF THE INVENTION

1. Field of the Invention

The present invention relates to a detection circuit and a detection method for a magnetostrictive torque sensor.

2. Description of the Related Art

A conventional magnetostrictive torque sensor is known, which uses a magnetostrictive material having magnetostrictive characteristics in which magnetic permeability changes when a torque (rotational torque) is applied, and the sensor is configured that a change in the magnetic permeability of the magnetostrictive material when the torque is applied is detected as a change in inductance of a detection coil and the torque applied to the magnetostrictive material is thereby detected.

Japanese Patent No.3526750 proposes a magnetostrictive torque sensor of which hysteresis characteristics are improved by performing shot peening on a surface of the magnetostrictive material.

Patent Literature 1: Japanese Patent No. 3526750

SUMMARY OF THE INVENTION

However, even when shot peening is performed on the surface of the magnetostrictive material, the effect of the shot peening does not reach a deep part of the magnetostrictive material. Therefore, measurement accuracy decreases in some cases by an influence of the deep part of the magnetostrictive material where the effect of shot peening does not reach.

Therefore, it is an object of the invention to provide a detection circuit and a detection method for a magnetostrictive torque sensor with high measurement accuracy.

To solve the problem mentioned above, the invention provides a detection circuit for a magnetostrictive torque sensor configured to detect a torque applied to a magnetostrictive material treated by shot peening, the detection circuit comprising:

a detection coil provided around the magnetostrictive material; and a drive unit for providing alternating current excitation to the detection coil, wherein the torque applied to the magnetostrictive material is detected based on a change in inductance of the detection coil, and the drive unit provides alternating current excitation at a frequency at which a skin effect thickness is not more than an effective depth of the shot peening.

To solve the problem mentioned above, the invention also provides a detection method for a magnetostrictive torque sensor configured to detect a torque applied to a magnetostrictive material treated by shot peening, the method comprising:

using a detection coil provided around the magnetostrictive material, and a drive unit for providing alternating current excitation to the detection coil at a frequency at which a skin effect thickness is not more than an effective depth of the shot peening; and detecting a torque applied to the magnetostrictive material based on a change in inductance of the detection coil.

Advantageous Effects of Invention

According to the invention, it is possible to provide a detection circuit and a detection method for a magnetostrictive torque sensor with high measurement accuracy.

DETAILED DESCRIPTION OF THE PREFERRED EMBODIMENT

Embodiment

An embodiment of the invention will be described below in conjunction with the appended drawings.

Figure 1A:
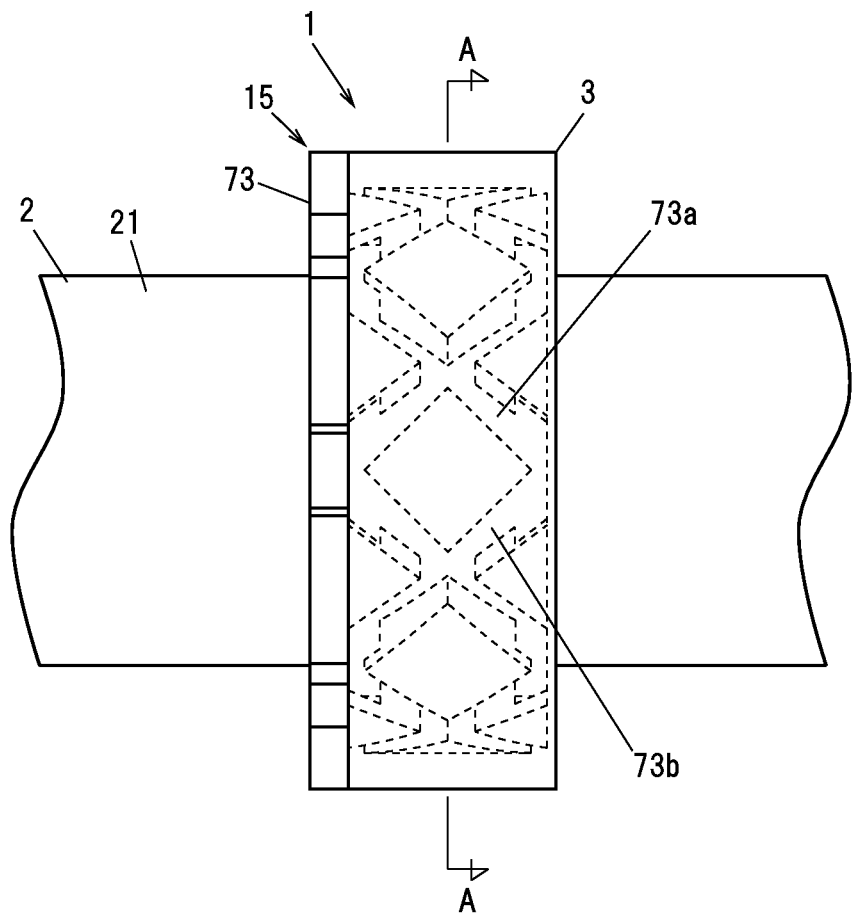
FIG. 1A is a side view showing a magnetostrictive torque sensor using a detection circuit for magnetostrictive torque sensor in an embodiment of the present invention.
Figure 1B:
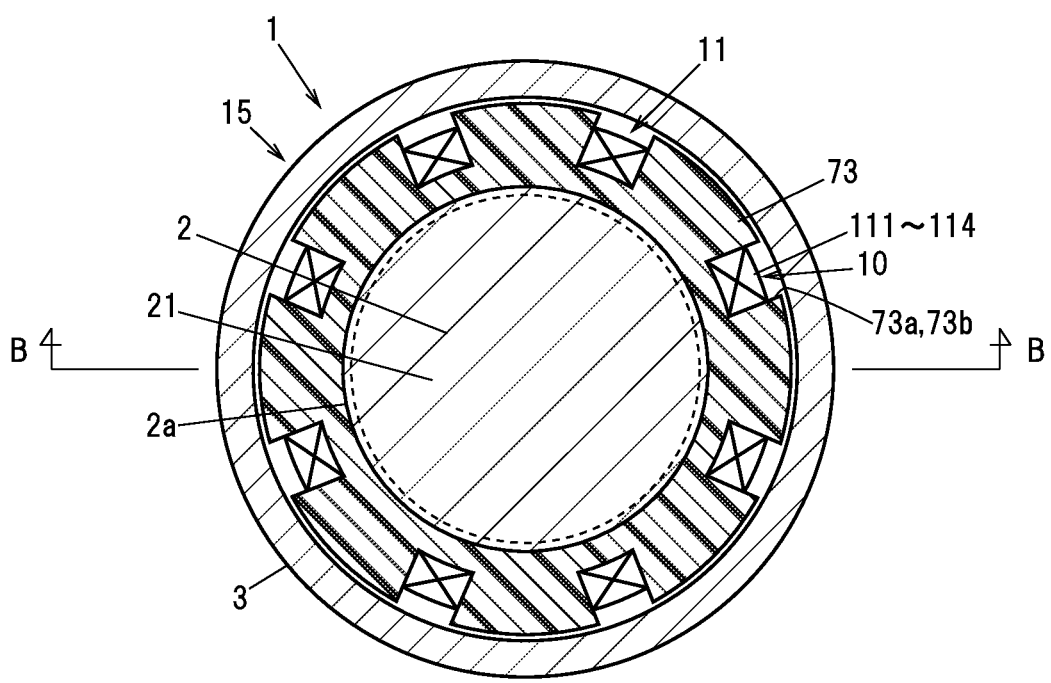
FIG. 1B is a cross sectional view taken along a line A-A of FIG. 1A.
Figure 2:
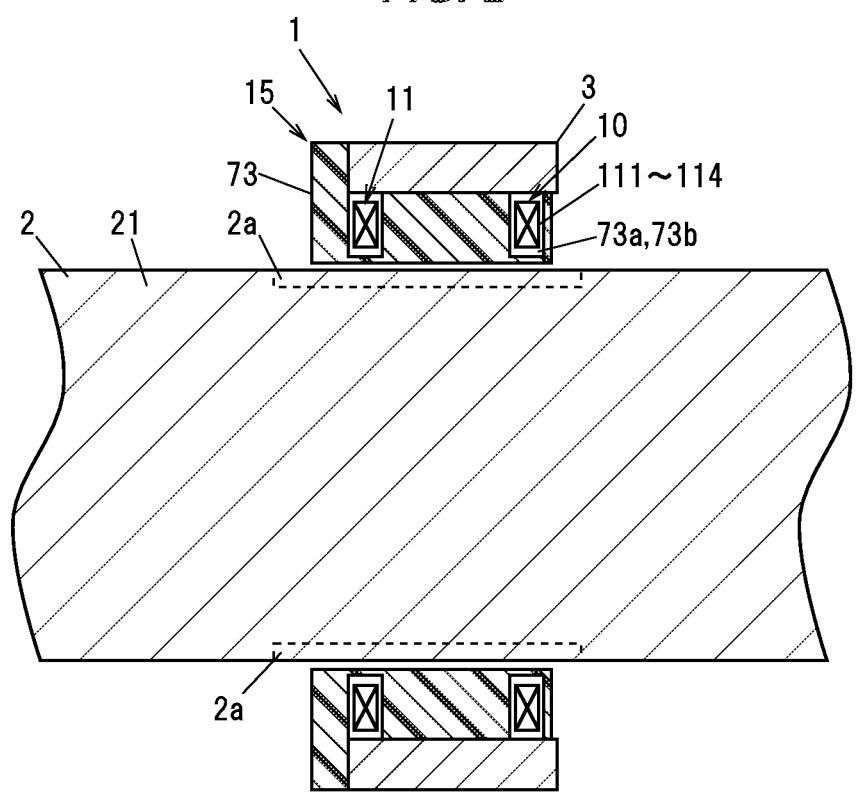
FIG. 2 is a cross sectional view taken along a line B-B of FIG. 1B.
Figure 3A:
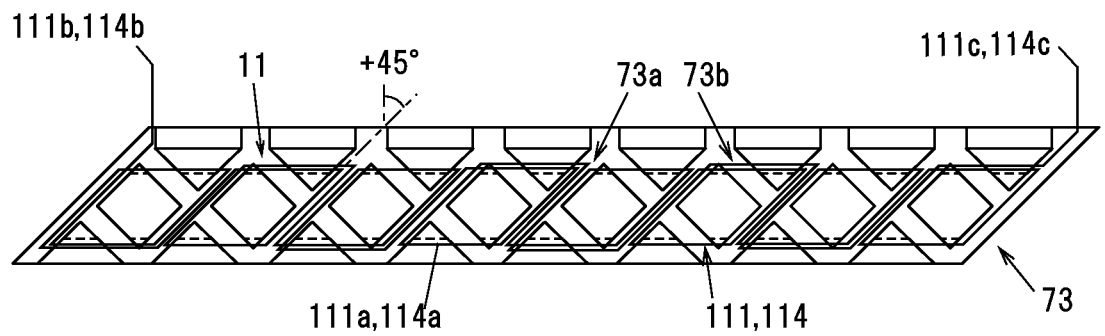
FIG. 3A is an explanatory diagram illustrating how first and fourth detection coils are wound in the magnetostrictive torque sensor of FIG. 1A.
Figure 3B:
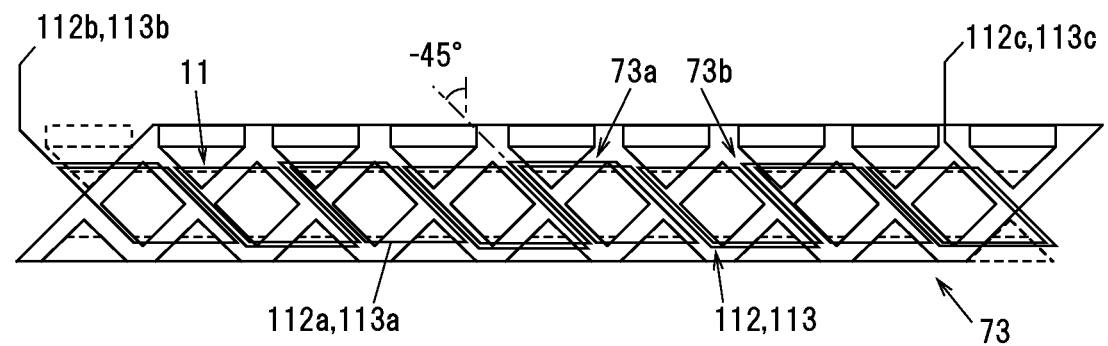
FIG. 3B is an explanatory diagram illustrating how second and third detection coils are wound.
Figure 4:
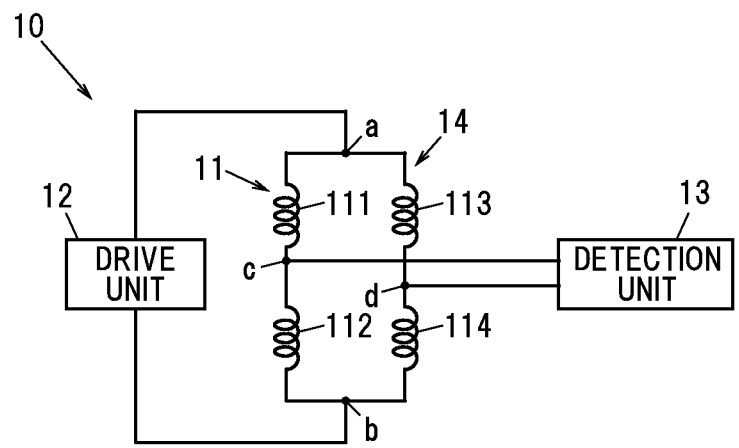
FIG. 4 is a circuit diagram illustrating the detection circuit for magnetostrictive torque sensor.

FIGS. 1A and 1B are diagrams illustrating a magnetostrictive torque sensor in the present embodiment, wherein FIG. 1A is a side view and FIG. 1B is a cross sectional view taken along a line A-A of FIG. 1A. FIG. 2 is a cross sectional view taken along a line B-B of FIG. 1B. FIGS. 3A and 3B are explanatory diagrams illustrating how detection coils are wound in the magnetostrictive torque sensor of FIG. 1A, wherein FIG. 3A is an explanatory diagram illustrating how first and fourth detection coils are wound and FIG. 3B is an explanatory diagram illustrating how second and third detection coils are wound. FIG. 4 is a circuit diagram illustrating the detection circuit for magnetostrictive torque sensor. A magnetostrictive torque sensor 1 in the present embodiment is a sensor configured to detect a torque (a rotational torque) applied to a magnetostrictive material.

As shown in FIGS. 1A to 4, the magnetostrictive torque sensor 1 includes a magnetostrictive material 2 having magnetic permeability which changes when a torque is applied, a detection circuit 10 for magnetostrictive torque sensor (hereinafter, simply referred to as "detection circuit 10") configured to detect the torque applied to the magnetostrictive material 2, and a magnetic ring 3.

The magnetostrictive material 2 used here is formed of a base material made of a chrome steel containing chrome, such as a chrome steel, a chrome-molybdenum steel or a nickel-chrome molybdenum steel, which is treated by carburizing, quenching and tempering and is then shot peened.

Mechanical strength, including toughness, of the magnetostrictive material 2 can be enhanced by carburizing, quenching and tempering. Meanwhile, by performing shot peening after carburizing, quenching and tempering, it is possible to cause martensitic transformation (diffusionless transformation) to occur on the surface and thereby possible to reduce non-magnetic austenite and increase ferromagnetic martensite. As a result, a change in magnetic permeability when stress is applied becomes large due to a decrease in the non-magnetic region and an increase in the magnetic region on the surface of the magnetostrictive material 2, plastic deformation decreases, and hysteresis due to stress fluctuation thus can be reduced.

The magnetostrictive material 2 has a columnar detection shaft 21 to which a torque is applied in a circumferential direction. The magnetostrictive material 2 of the magnetostrictive torque sensor 1 is, e.g., a shaft used to transfer torque in a powertrain system of a vehicle, or a shaft used to transfer torque of engine in a vehicle.

The detection circuit 10 in the present embodiment is a circuit that detect a torque applied to the shot-peened magnetostrictive material 2. The detection circuit 10 includes detection coils 11 provided around the magnetostrictive material 2, a drive unit 12 for providing AC excitation to the detection coils 11, and a detection unit 13 configured to detect a torque applied to the magnetostrictive material 2 based on changes in inductances of the detection coils 11.

In the present embodiment, the detection circuit 10 includes a bridge circuit 14 in which four detection coils 11 are bridge-connected. Hereinafter, the four detection coils 11 are respectively referred to as first to fourth detection coils 111-114. The bridge circuit 14 is configured such that the first detection coil 111 and the second detection coil 112 are connected in series, the third detection coil 113 and the fourth detection coil 114 are connected in series, and the first and second detection coils 111, 112 are connected in parallel to the third and fourth detection coils 113, 114.

The magnetostrictive torque sensor 1 has an annular sensor unit 15 that is provided to cover around the detection shaft 21. The sensor unit 15 has a hollow cylindrical bobbin 73 provided coaxially with and at a distance from the magnetostrictive material 2, the first to fourth detection coils 111-114 formed by winding insulated wires on the bobbin 73, and the magnetic ring 3.

Plural first inclined grooves 73a and plural second inclined grooves 73b are formed on the outer peripheral surface of the bobbin 73. The first inclined grooves 73a are formed so as to be inclined in one direction at a predetermined angle (inclined at +45 degrees in this example) relative to an axial direction of the detection shaft 21 of the magnetostrictive material 2, and the second inclined grooves 73b are formed so as to be inclined in another direction at a predetermined angle (inclined at −45 degrees in this example) relative to the axial direction of the detection shaft 21. The first inclined grooves 73a and the second inclined grooves 73b are formed of grooves that are recessed in a radial direction of the bobbin 73.

FIG. 3A is an explanatory diagram illustrating how the first and fourth detection coils 111, 114 are wound. The first and fourth detection coils 111, 114 are formed by winding insulated wires 111a, 114a on the bobbin 73 along the first inclined grooves 73a. That is, the first and fourth detection coils 111, 114 are provided around the detection shaft 21 so that a current path is inclined in one direction at a predetermined angle (inclined at +45 degrees in this example) relative to the axial direction of the detection shaft 21. In FIG. 3A, input and output ends of one layer of the first detection coil 111 are respectively denoted by the reference numerals 111b and 111c. Also in FIG. 3A, input and output ends of one layer of the fourth detection coil 114 are respectively denoted by the reference numerals 114b and 114c.

FIG. 3B is an explanatory diagram illustrating how the second and third detection coils 112, 113 are wound. The second and third detection coils 112, 113 are formed by winding insulated wires 112a, 113a on the bobbin 73 along the second inclined grooves 73b. That is, the second and third detection coils 112, 113 are provided around the detection shaft 21 so that a current path is inclined in another direction at a predetermined angle (inclined at −45 degrees in this example) relative to the axial direction of the detection shaft 21. In FIG. 3B, input and output ends of one layer of the second detection coil 112 are respectively denoted by the reference numerals 112b and 112c. Also in FIG. 3B, input and output ends of one layer of the third detection coil 113 are respectively denoted by the reference numerals 113b and 113c.

FIGS. 3A and 3B show winding of the insulated wires 111a, 112a, 113a, 114a for one turn, and the first to fourth detection coils 111-114 are formed by repeatedly winding the insulated wires 111a, 112a, 113a, 114a for an intended number of turns. The winding method shown in FIGS. 3A and 3B is an example, and the first to fourth detection coils 111-114 may be formed using another winding method.

As the insulated wires 111a, 112a, 113a, 114a used for the first to fourth detection coils 111-114, it is possible to use, e.g., magnet wires such as enameled wires formed by covering a solid conductor with an insulation layer formed of enamel. In addition, the number of turns is the same for the first to fourth detection coils 111-114.

The magnetic ring 3 is formed of a magnetic body (ferromagnetic body) and has a hollow cylindrical shape. The magnetic ring 3 is provided to cover around the first to fourth detection coils 111-114. The magnetic ring 3 acts to reduce magnetic reluctance in a magnetic circuit and suppress a decrease in sensitivity caused by leakage of a magnetic flux generated by the first to fourth detection coils 111-114 to the outside.

As shown in FIG. 4, the drive unit 12 applies AC voltage between a contact a, which is between the first detection coil 111 and the third detection coil 113, and a contact b, which is between the second detection coil 112 and the fourth detection coil 114, of the bridge circuit 14.

The detection unit 13 measures voltage between a contact c, which is between the first detection coil 111 and the second detection coil 112, and a contact d, which is between the third detection coil 113 and the fourth detection coil 114, of the bridge circuit 14.

When the drive unit 12 applies AC voltage between the contacts a and b, a current flows through the first to fourth detection coils 111-114 due to the AC voltage, AC excitation is applied to the first to fourth detection coils 111-114 and a magnetic flux is generated. The magnetic flux generated by the first to fourth detection coils 111-114 passes through the detection shaft 21 and the magnetic ring 3.

In the state in which a torque is not applied to the detection shaft 21 in the circumferential direction, impedances (inductances) of the first to fourth detection coils 111-114 are equal and voltage detected by the detection unit 13 is thus zero. On the other hand, when a torque is applied to the detection shaft 21 in the circumferential direction, magnetic permeability in a direction inclined relative to the axial direction of the detection shaft 21 changes, an induced current (eddy current) generated in the detection shaft 21 and a magnetic field generated by such an induced current change with the change in the magnetic permeability, then, the impedances (inductances) of the first to fourth detection coils 111-114 change due to this magnetic field, and voltage detected by the detection unit 13 thus changes. In this regard, since the first and fourth detection coils 111, 114 and the second and third detection coils 112, 113 are provided so as to be inclined in the opposite directions relative to the axial direction of the detection shaft 21, a torque when applied to the detection shaft 21 causes an increase in one of the impedances (inductances) and a decrease in the other impedance (inductance).

Since voltage detected by the detection unit 13 changes according to a magnitude of the torque applied to the detection shaft 21, the torque applied to the magnetostrictive material 2 can be detected by the detection unit 13 based on the detected voltage. In this regard, the voltage detected by the detection unit 13 is AC voltage. Therefore, to remove the common-mode components and detect only the differential components, the detection unit 13 should be configured to amplify a voltage difference between the contacts c and d by a differential amplifier circuit and further detect a torque applied to the magnetostrictive material 2 based on the detected signal.

(Frequency of AC Excitation Provided by the Drive Unit 12)

Figure 5:
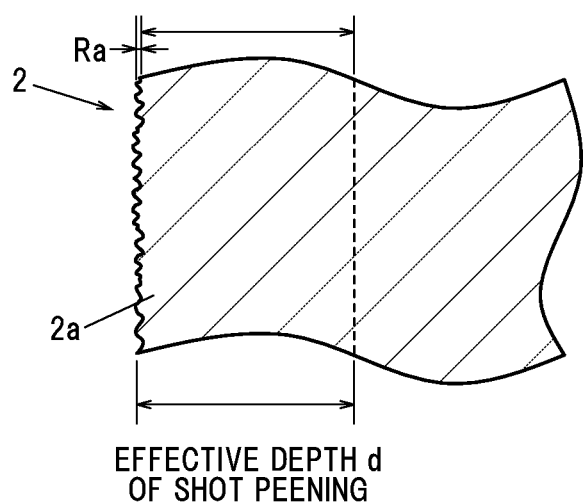
FIG. 5 is an explanatory diagram illustrating a preferable range of skin effect thickness corresponding to a frequency of AC excitation.

Now, a preferable frequency of AC excitation provided by the drive unit 12 will be examined. As described above, when performing shot peening on the surface of the magnetostrictive material 2, it is possible to improve sensitivity by causing a decrease in the non-magnetic region and an increase in the magnetic region on the surface of the magnetostrictive material 2 and a resulting large change in magnetic permeability caused when stress is applied, reduce measurement errors by decreasing plastic deformation and reducing hysteresis due to stress fluctuation, and thereby improve measurement accuracy. However, the effect by shot peening decreases from the surface of the magnetostrictive material 2 to the inside. An effective depth d of shot peening (a depth from the surface of the magnetostrictive material 2) is limited as shown in FIG. 5, and a characteristic improvement effect by shot peening is not obtained in a deeper region. That is, the characteristic improvement effect by shot peening is not sufficiently obtained under the conditions under which a magnetic flux enters a region deeper than the effective depth d of shot peening. In FIGS. 1B and 2, a region where shot peening is effective is indicated by the reference numeral 2a. The effective depth d of the invention is defined as a depth of a region in which austenite is reduced to not more than 10% by induction of martensitic transformation by shot peening.

On the other hand, when AC excitation is applied and if the frequency is sufficiently high, the region through which the magnetic flux passes is only the vicinity of the surface of the magnetostrictive material 2 due to the skin effect. In particular, a skin effect thickness D (m) is expressed by the following expression (1):

$$D = \sqrt{\frac{2\rho}{2\pi f \mu}} \quad (1)$$

where $\mu$ is the magnetic permeability of the magnetostrictive material 2, $\rho$ is the electrical resistivity ($\Omega \cdot m$) of the magnetostrictive material, and f is the frequency (Hz).

Thus, by configuring the drive unit 12 to provide AC excitation at the frequency f at which the skin effect thickness D in the expression (1) is not more than the effective depth d of the shot peening, entry of the magnetic flux into a region deeper than the effective depth d of the shot peening is suppressed and it is thereby possible to improve measurement accuracy of the magnetostrictive torque sensor 1.

When shot peening is performed under the conditions of use of a shot material having a shot size of not less than 0.6 mm and a Rockwell hardness of not less than 60 at an air pressure of not less than 0.4 MPa for exposure time of not less than 2 minutes, the effective depth d of shot peening is about 100 μm to 200 μm. The effective depth d of shot peening is also described in, e.g., "Pressure engineering" (Vol. 41, No. 5, pp. 19-28) and "The Journal of Japan Institute of Metals and Materials" (Vol. 70, No. 5, 2006, pp. 415-419) and is said to be about 200 μm.

Therefore, the drive unit 12 preferably provides AC excitation at the frequency f at which the skin effect thickness D is not more than 200 μm. When chrome steel is used as the magnetostrictive material 2, the relative magnetic permeability $\mu$ is about 100 and the electrical resistivity $\rho$ is about 0.2 to 1.0 $\mu\Omega \cdot m$. Therefore, to obtain the skin effect thickness D that is not more than the effective depth d of shot peening (in this example, not more than 200 μm), the frequency f needs to be not less than 50 kHz. Considering variations in the relative magnetic permeability $\mu$ and the electrical resistivity $\rho$, the frequency f is desirably not less than 100 kHz.

Meanwhile, the surface of the magnetostrictive material 2 is rough and has fine irregularities due to shot peening. Therefore, if the frequency f is too high and the skin effect thickness D is very small, measurement accuracy may decrease by being affected by the rough surface. Based on this, in the present embodiment, the drive unit 12 is configured to provide AC excitation at a frequency at which the skin effect thickness D is greater than an arithmetic mean roughness Ra of the surface of the magnetostrictive material 2 (the detection shaft 21). In other words, as shown in FIG. 5, the frequency f of AC excitation provided by the drive unit 12 is desirably a frequency at which the skin effect thickness D satisfies the condition expressed by the following expression (2):

$$Ra < D \leq d \quad (2)$$

where Ra: Arithmetic mean roughness of the surface of the magnetostrictive material 2 d: Effective depth of shot peening

If the arithmetic mean roughness Ra of the surface of the magnetostrictive material 2 is too large, measurement accuracy may decrease even if the skin effect thickness D is sufficiently larger than the arithmetic mean roughness Ra. Therefore, the arithmetic mean roughness Ra of the surface of the magnetostrictive material 2 is desirably not more than 10 μm. In other words, the drive unit 12 should provide AC excitation at a frequency at which the skin effect thickness D is more than 10 μm. Meanwhile, when the skin effect thickness D has a value very close to the arithmetic mean roughness Ra (or the maximum height Rz), it is likely to be affected by the rough surface. Therefore, it is more desirable that the drive unit 12 be configured to provide AC excitation at the frequency f at which the skin effect thickness D is not less than double the arithmetic mean roughness Ra of the surface of the magnetostrictive material 2.

The maximum height Rz is also known as a surface roughness parameter. The maximum height Rz indicates a difference in height between the lowest part and the highest part of the surface and is larger than the value of the arithmetic mean roughness Ra. Therefore, in order to be less affected by the rough surface, it is more preferable that the drive unit 12 provide AC excitation at a frequency at which the skin effect thickness D is greater than the maximum height Rz of the surface of the magnetostrictive material 2. In the present embodiment, considering variations in the relative magnetic permeability μ and the electrical resistivity ρ, the frequency f is not more than 1 MHz. As such, it is more desirable that the drive unit 12 provide AC excitation at the frequency f of not less than 100 kHz and not more than 1 MHz.

(Modification)

Figure 6A:
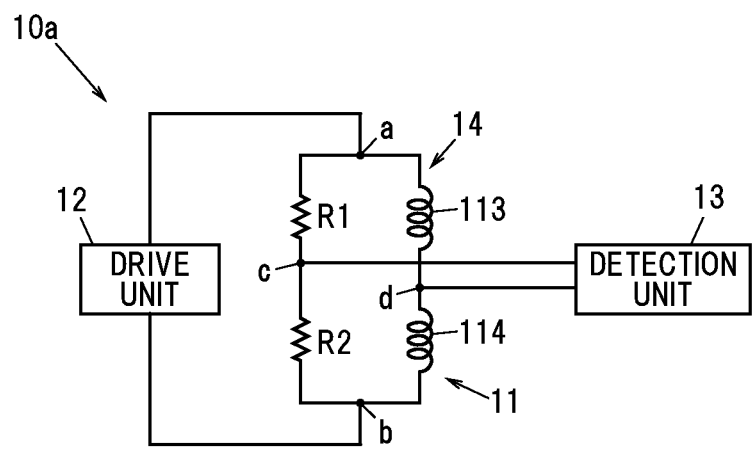
FIG. 6A is a circuit diagram illustrating a modification of the detection circuit for magnetostrictive torque sensor.
Figure 6B:
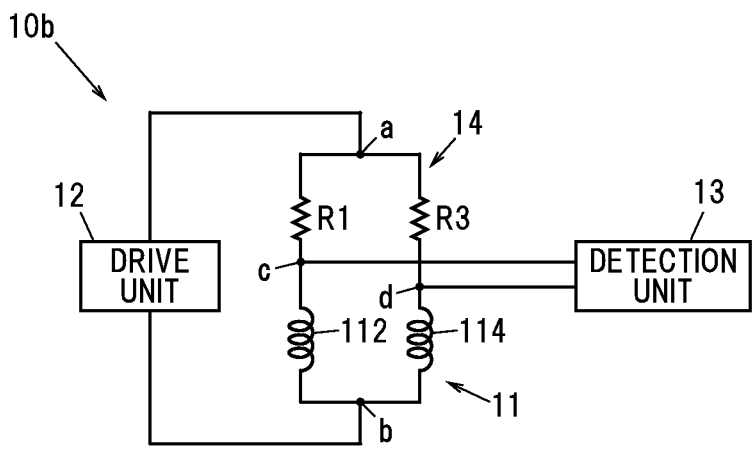
FIG. 6B is a circuit diagram illustrating a modification of the detection circuit for magnetostrictive torque sensor.

Although four detection coils 11 are used in the present embodiment, the number of the detection coils 11 to be used is not limited thereto. The configuration may be such that, e.g., the first and second detection coils 111, 112 are replaced with resistors R1, R2, and only two detection coils 11, the third and fourth detection coils 113, 114, are used, as in a detection circuit 10a shown in FIG. 6A. Similarly to this, the configuration may be such that the third and fourth detection coils 113, 114 are replaced with resistors and only the first and second detection coils 111, 112 are used. Furthermore, the configuration may be such that the first and third detection coils 111, 113 are replaced with resistors R1, R3, and only two detection coils 11, the second and fourth detection coils 112, 114, are used, as in a detection circuit 10b shown in FIG. 6B. Similarly to this, the configuration may be such that the second and fourth detection coils 112, 114 are replaced with resistors and only the first and third detection coils 111, 113 are used.

Still further, even in case of using four detection coils 11, only some of the detection coils 11 may be provided around the magnetostrictive material 2. For example, only the first and second detection coils 111, 112 may be provided around the magnetostrictive material 2, or only the third and fourth detection coils 113, 114 may be provided around the magnetostrictive material 2. Or, only the first and third detection coils 111, 113 may be provided around the magnetostrictive material 2, or only the second and fourth detection coils 112, 114 may be provided around the magnetostrictive material 2. In other words, it is acceptable as long as at least two of the first to fourth detection coils 111-114 are provided around the magnetostrictive material 2. In this case, the detection coils 11 not to be provided around the magnetostrictive material 2 may be provided around, e.g., a reference magnetostrictive material which is provided separately from the magnetostrictive material 2 and to which any external force (stress) is not applied.

Functions and Effects of the Embodiment

As described above, the detection circuit 10 for magnetostrictive torque sensor in the embodiment is configured that the drive unit 12 provides AC excitation at the frequency f at which the skin effect thickness D is not more than the effective depth d of shot peening. As a result, entry of the magnetic flux into a region deeper than the effective depth d of shot peening is suppressed and it is thereby possible to improve measurement accuracy of the magnetostrictive torque sensor 1.

Summary of the Embodiment

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A detection circuit (10) for a magnetostrictive torque sensor configured to detect a torque applied to a magnetostrictive material (2) treated by shot peening, the detection circuit (10) comprising: a detection coil (11) provided around the magnetostrictive material (2); and a drive unit (12) for providing alternating current excitation to the detection coil (11), wherein the torque applied to the magnetostrictive material (2) is detected based on a change in inductance of the detection coil (11), and the drive unit (12) provides alternating current excitation at a frequency at which a skin effect thickness is not more than an effective depth of the shot peening.

[2] The detection circuit (10) for a magnetostrictive torque sensor described in [1], wherein the drive unit (12) provides alternating current excitation at a frequency at which a skin effect thickness is not more than 200 μm.

[3] The detection circuit (10) for a magnetostrictive torque sensor described in [1] or [2], wherein the drive unit (12) provides alternating current excitation at a frequency at which a skin effect thickness is greater than an arithmetic mean roughness Ra of a surface of the magnetostrictive material (2).

[4] The detection circuit (10) for a magnetostrictive torque sensor described in [2], wherein the drive unit (12) provides alternating current excitation at a frequency at which a skin effect thickness is more than 10 μm.

[5] The detection circuit (10) for a magnetostrictive torque sensor described in any one of [1] to [3], wherein the drive unit (12) provides alternating current excitation at a frequency of not less than 100 kHz and not more than 1 MHz.

[6] The detection circuit (10) for a magnetostrictive torque sensor described in any one of [1] to [5], comprising: a bridge circuit (14) comprising four of the detection coils (11) that are bridge-connected, wherein the bridge circuit (14) is configured such that first and second detection coils (111, 112) are connected in series, third and fourth detection coils (113, 114) are connected in series, and the first and second detection coils (111, 112) are connected in parallel to the third and fourth detection coils (113, 114), and at least two of the first to fourth detection coils (111-114) are provided around the magnetostrictive material (2).

[7] The detection circuit (10) for a magnetostrictive torque sensor described in [6], wherein the magnetostrictive material (2) comprises a detection shaft (21) to which a torque is applied in a circumferential direction, the first and fourth coils (111, 114) are provided around the detection shaft (21) so that a current path is inclined in one direction at a predetermined angle relative to an axial direction of the detection shaft (21), the second and third coils (112, 113) are provided around the detection shaft (21) so that a current path is inclined in another direction at the predetermined angle relative to the axial direction of the detection shaft, and the torque applied to the detection shaft (21) can be detected.

[8] A detection method for a magnetostrictive torque sensor configured to detect a torque applied to a magnetostrictive material (2) treated by shot peening, the method comprising: using a detection coil (11) provided around the magnetostrictive material (2), and a drive unit (12) for providing alternating current excitation to the detection coil (11) at a frequency at which a skin effect thickness is not more than an effective depth of the shot peening; and detecting a torque applied to the magnetostrictive material (2) based on a change in inductance of the detection coil (11).

[9] The method described in [8], wherein an arithmetic mean roughness Ra of a surface of the magnetostrictive material (2) is not more than 10 μm.

Although the embodiment of the invention has been described, the invention according to claims is not to be limited to the embodiment described above. Further, please note that all combinations of the features described in the embodiment are not necessary to solve the problem of the invention. In addition, the invention can be appropriately modified and implemented without departing from the gist thereof.

The invention claimed is:

1. A detection circuit for a magnetostrictive torque sensor configured to detect a torque applied to a magnetostrictive material treated by shot peening, the detection circuit comprising:
   a detection coil provided around the magnetostrictive material; and
   a drive unit for providing alternating current excitation to the detection coil,
   wherein the torque applied to the magnetostrictive material is detected based on a change in inductance of the detection coil, and the drive unit provides alternating current excitation at a frequency at which a skin effect thickness is not more than an effective depth of the shot peening.

2. The detection circuit for a magnetostrictive torque sensor according to claim 1, wherein the drive unit provides alternating current excitation at a frequency at which a skin effect thickness is not more than 200 μm.

3. The detection circuit for a magnetostrictive torque sensor according to claim 1, wherein the drive unit provides alternating current excitation at a frequency at which a skin effect thickness is greater than an arithmetic mean roughness Ra of a surface of the magnetostrictive material.

4. The detection circuit for a magnetostrictive torque sensor according to claim 2, wherein the drive unit provides alternating current excitation at a frequency at which a skin effect thickness is more than 10 μm.

5. The detection circuit for a magnetostrictive torque sensor according to claim 1, wherein the drive unit provides alternating current excitation at a frequency of not less than 100 kHz and not more than 1 MHz.

6. The detection circuit for a magnetostrictive torque sensor according to claim 1, comprising:
   a bridge circuit comprising four of the detection coils that are bridge-connected,
   wherein the bridge circuit is configured such that first and second detection coils are connected in series, third and fourth detection coils are connected in series, and the first and second detection coils are connected in parallel to the third and fourth detection coils, and at least two of the first to fourth detection coils are provided around the magnetostrictive material.

7. The detection circuit for a magnetostrictive torque sensor according to claim 6, wherein the magnetostrictive material comprises a detection shaft to which a torque is applied in a circumferential direction, the first and fourth coils are provided around the detection shaft so that a current path is inclined in one direction at a predetermined angle relative to an axial direction of the detection shaft, the second and third coils are provided around the detection shaft so that a current path is inclined in another direction at the predetermined angle relative to the axial direction of the detection shaft, and the torque applied to the detection shaft can be detected.

8. A detection method for a magnetostrictive torque sensor configured to detect a torque applied to a magnetostrictive material treated by shot peening, the method comprising:
   using a detection coil provided around the magnetostrictive material, and a drive unit for providing alternating current excitation to the detection coil at a frequency at which a skin effect thickness is not more than an effective depth of the shot peening; and
   detecting a torque applied to the magnetostrictive material based on a change in inductance of the detection coil.

9. The method according to claim 8, wherein an arithmetic mean roughness Ra of a surface of the magnetostrictive material is not more than 10 μm.

* * * * *